United States Patent
D'Souza et al.

(10) Patent No.: US 9,577,874 B2
(45) Date of Patent: Feb. 21, 2017

(54) METHOD AND APPARATUS FOR IP/MPLS FAST REROUTE

(71) Applicant: Telefonaktiebolaget L M Ericsson (publ), Stockholm (SE)

(72) Inventors: Pramodh D'Souza, San Jose, CA (US); Lars Ernström, Palo Alto, CA (US); Reda Haddad, San Jose, CA (US); Evgeny Tantsura, Palo Alto, CA (US); Jakob Heitz, Santa Clara, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 117 days.

(21) Appl. No.: 13/902,583

(22) Filed: May 24, 2013

(65) Prior Publication Data

US 2014/0269261 A1    Sep. 18, 2014

Related U.S. Application Data

(60) Provisional application No. 61/784,361, filed on Mar. 14, 2013.

(51) Int. Cl.
*H04L 12/24* (2006.01)
*H04L 12/703* (2013.01)
(Continued)

(52) U.S. Cl.
CPC .......... *H04L 41/0668* (2013.01); *H04L 45/22* (2013.01); *H04L 45/28* (2013.01); *H04L 45/50* (2013.01); *H04L 45/64* (2013.01)

(58) Field of Classification Search
CPC .......... H04L 45/28; H04L 45/22; H04L 45/00; H04L 29/14; H04L 12/2422
(Continued)

(56) References Cited

U.S. PATENT DOCUMENTS 6,915,351 B2 * 7/2005 Tahan ........................ 709/242
7,525,904 B1 * 4/2009 Li et al. ...................... 370/217
(Continued)

FOREIGN PATENT DOCUMENTS

WO    WO-2014/140966 A1    9/2014

OTHER PUBLICATIONS

Atlas, A. , et al., "An Architecture for IP/LDP Fast-Reroute Using Maximally Redundant Trees draft-atlas-rtgwg-mrt-frr-architecture-01", Oct. 31, 2011; 26 pages.
(Continued)

*Primary Examiner* — Maharishi Khirodhar
*Assistant Examiner* — Sanjay K Dewan
(74) *Attorney, Agent, or Firm* — Nicholson, De Vos, Webster & Elliot, LLP

(57) ABSTRACT

A method is disclosed that is implemented by a router for executing an internet protocol fast reroute process in response to a network event invalidating a current route to a destination node without degrading forwarding plane functionality or performance caused by indirect forwarding information base lookups. The method comprises a set steps including receiving or generating the network event by the router, the network event associated with a network event identifier and looking up the network event identifier in an event table to determine routes that are affected by the network event. The method further includes determining whether a route with a fast reroute forwarding object is affected by the network event in the routing information base and overwriting a current next hop forwarding object using a backup next hop forwarding object in the forwarding information base.

10 Claims, 4 Drawing Sheets

(51) Int. Cl.
*H04L 12/707* (2013.01)
*H04L 12/723* (2013.01)
*H04L 12/715* (2013.01)

(58) Field of Classification Search
USPC .................................................... 370/225
See application file for complete search history.

(56) References Cited

U.S. PATENT DOCUMENTS

| | | | | |
|---|---|---|---|---|
| 7,539,131 | B2* | 5/2009 | Shen | 370/217 |
| 7,990,993 | B1 | 8/2011 | Ghosh et al. | |
| 8,077,726 | B1* | 12/2011 | Kumar et al. | 370/395.31 |
| 8,467,411 | B1* | 6/2013 | Minei et al. | 370/467 |
| 8,543,728 | B2* | 9/2013 | Pan et al. | 709/238 |
| 8,811,158 | B1* | 8/2014 | Addepalli | 370/225 |
| 8,958,286 | B1 | 2/2015 | Atlas et al. | 370/225 |
| 2003/0067941 | A1* | 4/2003 | Fall | 370/468 |
| 2005/0094554 | A1* | 5/2005 | Nakash | 370/222 |
| 2006/0251044 | A1* | 11/2006 | Haddad | 370/349 |
| 2006/0262915 | A1* | 11/2006 | Marascio et al. | 379/201.01 |
| 2007/0091795 | A1* | 4/2007 | Bonaventure et al. | 370/228 |
| 2007/0177599 | A1* | 8/2007 | Yazaki | H04L 41/0896 370/392 |
| 2008/0092229 | A1* | 4/2008 | Khanna et al. | 726/15 |
| 2008/0267078 | A1* | 10/2008 | Farinacci et al. | 370/244 |
| 2009/0201803 | A1* | 8/2009 | Filsfils et al. | 370/222 |
| 2010/0008363 | A1* | 1/2010 | Ee et al. | 370/392 |
| 2011/0228785 | A1* | 9/2011 | Filsfils et al. | 370/395.31 |
| 2012/0218884 | A1* | 8/2012 | Kini et al. | 370/228 |
| 2013/0051217 | A1* | 2/2013 | So et al. | 370/217 |
| 2013/0148495 | A1* | 6/2013 | Zhang et al. | 370/225 |
| 2013/0155840 | A1* | 6/2013 | Li et al. | 370/217 |
| 2013/0259056 | A1* | 10/2013 | Kotrabasappa et al. | 370/401 |
| 2013/0322231 | A1* | 12/2013 | Csaszar et al. | 370/217 |
| 2014/0119379 | A1* | 5/2014 | Liang et al. | 370/401 |
| 2015/0036685 | A1* | 2/2015 | Wijnands et al. | 370/390 |
| 2015/0078381 | A1* | 3/2015 | Willis | 370/392 |
| 2015/0085644 | A1* | 3/2015 | Kotalwar et al. | 370/228 |

OTHER PUBLICATIONS

Atlas, A., et al., "Basic Specification for IP Fast Reroute: Loop-Free Alternative", RFC:5286; Sep. 2008; Standards Tracks; 31 pages.
Bryant, S., et al., "Remote LFA FRR draft-shand-remote-lfa-00", Oct. 11, 2011; 12 pages.
Filsfils, C., et al., "Loop-Free Alternate (LFA) Applicability in Service Provider (SP) Networks", RFC: 6571; Jun. 2012; 22 pages.
"International Search Report" for Counterpart PCT Application No. PCT/IB2014/059055 mailed Jun. 24, 2014, 3 pages.

* cited by examiner

METHOD AND APPARATUS FOR IP/MPLS FAST REROUTE

CROSS-REFERENCE TO RELATED APPLICATION

The present application claims priority from U.S. Provisional Patent Application No. 61/784,361, filed on Mar. 14, 2013.

FIELD OF THE INVENTION

The embodiments of the invention relate to the field of network routing. Specifically, the embodiments relate to a method and system for quickly rerouting data traffic in response to a failure of a primary route, by switching to a predetermined alternate route.

BACKGROUND

Internet Protocol (IP) traffic can be routed across the Internet by using discovery and routing protocols that are executed by the nodes of the Internet such that they can determine optimal and loop free routes from any data traffic source to any data traffic destination using topology information exchanged between the nodes. Each node in the network utilizes the topology ascertained through the discovery protocols to construct forwarding tables that are consistent across the network. The process of arriving at these routes and forwarding tables can be called 'convergence.' The routes and forwarding tables are recalculated when there is a change in network topology. However, re-calculating these routes and tables can take time (i.e., long convergence time) during which some traffic may be blocked or lost.

IP and Multi-Protocol Label Switching (MPLS) Fast Reroute technologies address the problem with the long convergence of routing protocols by providing backup paths, which are used when network failures occur. These technologies are important due to the increased use of IP transport for real time services such as video, voice and television and the increasing number of web services which all are expected to work without disruption.

The standard approach used in existing technologies, such as open shortest path first (OSPF)/intermediate system-intermediate system (ISIS)/link discovery protocol (LDP) loop free alternative (LFA), maximally redundant trees (MRT), border gateway protocol (BGP) fast reroute (FRR), is to gather network information using a routing/signaling protocol and based on that information compute the backup paths necessary to prepare for failures of adjacent links or nodes, and then to pre-provision the forwarding plane with those back-up paths. The forwarding plane is then able to react on a failure event and switch from a primary path to a back-up path without waiting for the routing protocol to gather updated network information and converge.

SUMMARY

A method is disclosed that is implemented by a router for executing an internet protocol fast reroute process in response to a network event invalidating a current route to a destination node without degrading forwarding plane functionality or performance caused by indirect forwarding information base lookups. The method comprises a set steps including receiving or generating the network event by the router, the network event associated with a network event identifier and looking up the network event identifier in an event table to determine routes that are affected by the network event. The method further includes determining whether a route with a fast reroute forwarding object is affected by the network event in the routing information base and overwriting a current next hop forwarding object using a backup next hop forwarding object in the forwarding information base.

A network element is disclosed for executing an internet protocol fast reroute process in response to a network event invalidating a current route to a destination node without degrading forwarding plane functionality or performance caused by indirect forwarding information base lookups. The network element comprising a first storage device to store a routing information base and a line card including a network processing device and a storage device, the storage device to store the forwarding information base. The network processor is configured to execute a proxy function module and a switch function module. The proxy function module is configured to receive or generate the network event, the network event associated with a network event identifier, to look up the network event identifier in an event table to determine routes that are affected by the network event, and to determine whether a route with a fast reroute forwarding object is affected by the network event in the routing information base. The switch function module is configured to overwrite a current next hop forwarding object using a backup next hop forwarding object in the forwarding information base.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1A:
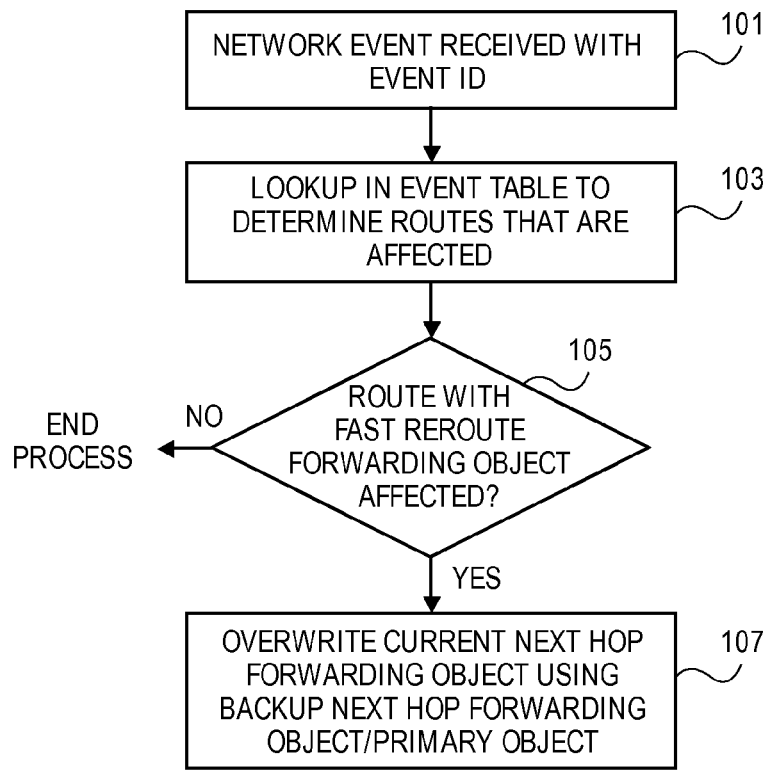
FIG. 1A is a flowchart of one embodiment of a process for implementing a fast reroute process using fast reroute routing information base forwarding objects.

In the following description, numerous specific details are set forth. However, it is understood that embodiments of the invention may be practiced without these specific details. In other instances, well-known circuits, structures and techniques have not been shown in detail in order not to obscure the understanding of this description. In other instances, control structures, gate level circuits and full software instruction sequences have not been shown in detail in order not to obscure the invention. Those of ordinary skill in the art, with the included descriptions, will be able to implement appropriate functionality without undue experimentation.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

To facilitate understanding of the embodiments, dashed lines have been used in the figures to signify the optional nature of certain items (e.g., features not supported by a given embodiment of the invention; features supported by a given embodiment, but used in some situations and not in others).

The techniques shown in the figures can be implemented using code and data stored and executed on one or more electronic devices. An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices includes hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). A 'set,' as used herein, refers to any positive whole number of items. The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge) is a piece of networking equipment, including hardware and software that communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

The embodiments of the invention described herein below provide a method and apparatus for implementing fast reroute for Internet Protocol (IP) and multi-protocol label switching (MPLS), media access control (MAC) routes or other addressing scheme used for communication in a data network. The method and apparatus implement the fast reroute without forwarding degradation (increased overhead or processing in the forwarding plane) by using a replica of the primary or backup next-hop forwarding information base forwarding object, which makes it possible for some routes to use a backup path while other routes do not. The method and apparatus enable many routes to point to the same fast reroute forwarding object as the next-hop, both in the control plane and in forwarding plane. The method and apparatus switch between a primary or backup next hop by use of one single rewrite of the next-hop in the forwarding plane, which enables all routes using the backup next-hop to switch. The method and apparatus support a control plane that keeps full hierarchical forwarding paths for both primary and back-up routes.

Some key properties of the embodiments include that in the control plane function a fast reroute (FRR) next-hop provides a protected (backup) path with a primary next hop and backup next-hop. In the forwarding plane function, a non-hierarchical FRR next-hop is at any instant in time a replica either of the primary next hop forwarding object or of the backup next-hop forwarding object. In this way, the forwarding plane function can be totally unaware of the FRR function and thereby forwarding degradation is avoided.

The disadvantages of the prior art include that fast reroute requires additional processing and resources due to the use of indirection in the routing information base and forwarding information base. Also, hierarchical fast reroute without forwarding degradation is not supported.

Fast rerouting (FRR) technologies include Loop Free Alternates (LFA) and remote LFAs, which are technologies used to provide Internet Protocol Fast rerouting (IPFRR) based on Interior Gateway Protocols (IGPs) such as open shortest path first (OSPF) and intermediate system—intermediate system (ISIS) protocols. An IGP running within a router builds a database which tracks all links within the applicable network area. LFA computes loop free alternate routes using the IGP data base. Border gateway protocol (BGP) diverse path, BGP best external, and BGP add path are BGP technologies which gives BGP routers the capability to distribute and learn multiple alternates for a single prefix and the ability to realize IPFRR. Maximally Redundant Trees (MRT) is another IPFRR technology which is based on knowledge of the topology of a network provided by an IGP. The embodiments described herein are each compatible with these technologies. Examples may be discussed using specific routing and FRR technologies, however, one skilled in the art would understand that the principles, steps and structures of these examples are applicable to the other technologies.

Overview

In one embodiment, the FRR functions may be conceived of as being partitioned in the following four functions (1) the control plane function, (2) the forwarding plane function, (3) the FRR proxy function and (4) the switching function. The control plane function manages the routing/forwarding information including the routes having protected next-hops with primary and backup next-hops defined. The control plane participates in routing and signaling protocols to build the routing information base (RIB) or similar data structure. The control plane also performs the updating of the forwarding information base (FIB) for the forwarding plane.

The forwarding plane function implements the forwarding of data traffic based on the FIB. The forwarding plane is not aware of the FRR functions. The FRR proxy function is an intermediary function between the control plane and the forwarding plane. Towards the control plane it acts as the forwarding plane and towards the forwarding plane it acts as the control plane. The FRR proxy function may be physically co-located with the forwarding processing unit (i.e., a central processing unit or network processing unit) or with the control plane processor unit (i.e., a central processing unit) or in a separate processing unit. For routes without FRR next-hops the FRR proxy function simply relays the routes and next-hops to the forwarding plane. For a route with an FRR next-hop, the FRR proxy function will replace the FRR next-hop by a replica of the primary next-hop referenced by the former. In addition, the FRR proxy function will relay the backup next-hop and the trigger event identities to the switching function to enable the switching function to perform the FRR switch-over by overwriting the FRR next-hop, i.e. overwriting the replica of the primary next-hop with the backup next-hop information when applicable events are identified.

In the case of hierarchical FRR where one FRR next-hop references another FRR next-hop, the FRR proxy function compresses a chain of multiple FRR next-hops into a single FRR next-hop by walking the next-hop chain through primary next-hop references until a non-FRR next-hop is reached. The FRR proxy function provides the FRR next-hop as a replica of this first non-FRR next-hop. As in the non-hierarchical case, the backup and trigger identities are provided to the switching function. However, in the hierarchical FRR case there may be multiple backups where each backup is triggered by a separate event. This is illustrated by a use case with BGP FRR combined hierarchically with LDP FRR, which is discussed further herein below. The set of backup next-hops is determined by walking the next-hop chain along the primary reference with the exception of one level where the backup next-hop and trigger identity is taken. Thus, for a hierarchy of n levels of FRR there will be n backups, one for each level. The FRR proxy function also takes care of updating hierarchical FRR next-hops dependent on other FRR next-hops in the next-hop chain in case of changes in the latter.

The FRR switching function as described above is responsible for performing the FRR switchover. As with the FRR proxy function, the switching function can be collocated with the forwarding plane, or with the control plane, or in a separate processing unit. The switchover is implemented by the overwriting of the FIB next hop forwarding object as specified by the proxy function. In other embodiments, the proxy and switching functions, can be combined or separately implemented with any combination or permutation of functions.

FIG. 1A is a flowchart of one embodiment of a process for implementing a fast reroute process using fast reroute routing information base forwarding objects. In one embodiment, the process is executed by the proxy function and/or switch functions of the router. These functions can be implemented at the control and forwarding planes, specifically the processing units of these planes, which may be part of a general router central processing or network processing unit (e.g., for the control plane) or a central processing unit or network processing unit of a set of line cards within the router. A 'set,' as used herein refers to any positive whole number of items, including one item.

The process can be initiated in response to receiving a network event (Block 101). The network event can be received from an external source such as a message from a neighboring router or from an internal source such as a signal from a port or similar source. The network event can be an indicator of a change in the functioning of the router, such as a failed port, or a change in the function of the network such as a failed link. The network event can include an event identifier that can indicate a type of the network event. Any type of encoding of these network events can be utilized and the router can look up the type of the event using the event identifier (Block 103). In one embodiment, an event table can be maintained by the control plane of the router, which contains a set of entries identifying the actions to be taken in response to receiving each of the types of network events or notifications containing the network event identifiers. In one example embodiment, the network event can be a fast reroute message expressly identifying a route to be switched to a backup route.

In one embodiment, the network event indicates that a topology of the network has changed such that the routes defined in the routing information base of the router are affected. Each of the affected routes is checked to determine whether a fast reroute forwarding object is included (Block 105). The entries in the routing information base are data structures containing information about a route from the router to a destination. This information can include next hop information and similar information that enables all data traffic that arrives at the router to be forwarded toward its destination. The routing information base is used to manage and update a forwarding information base utilized by the data plane of the router, which includes similar data structures that include next hop information for each known destination. These entries are described herein as being 'objects,' however, one skilled in the art would understand that any type of data structure can be used to represent and organize this information. Further, the objects form a set of information utilized for forwarding and thus, the term forwarding object is utilized herein.

A fast reroute forwarding object is a forwarding object that can contain alternate route information. The fast reroute forwarding object can include information including next hop information for any number of alternate routes and related alternate route information. The next hop information can include an address (e.g., an IP address, port, label or similar address) and related information about an adjacent network device such as a router. The identification and construction of the alternate routes can be accomplished using any type of routing protocol and/or protection protocol. The next hop information can be referred to as next hop forwarding objects.

Dependent of the type of network event identifier, a determination is made whether a primary route for each destination with a fast reroute forwarding object is no longer valid, due to a link failure, port failure or similar problem associated with the primary route. If the primary route is no longer valid, optionally a check may be made whether the backup route is valid (if the backup route is not valid then the process may end and require that the routing protocol reconverge). If the backup route is valid, then the current next hop forwarding object for the destination in the forwarding information base of the forwarding plane is overwritten with a copy or replica of a next hop forwarding object of the backup up next hop as defined in the fast reroute forwarding object of the routing information base (Block 107). The forwarding plane is not involved in this process at the time of data packet forwarding. The next hop object overwrite process or 'switch' process is transparent to the data forwarding process, which looks up destination addresses of incoming data traffic and receives different next hop information from a lookup in the forwarding information base before and after the switch.

The use of the fast reroute forwarding objects in the routing information base and the implementation of the FRR switch and FRR proxy function separate from the forwarding functions provides a fast reroute implementation without degradation of the forwarding function due to the forwarding function having to perform indirect next hop look ups on the forwarding information base where pointers might have been utilized in the forwarding information base to identify backup up next hop objects.

In one embodiment, the next hop forwarding objects overwritten into the forwarding information base by the FRR switch or FRR proxy function, are replicas or copies having unique identifiers to enable the original to be distinguished from the copies.

The example process illustrated and described in relation to FIG. 1A involves the case where there is a primary route and a backup route. However, one skilled in the art would understand that the fast reroute forwarding object can define any number of alternate paths and/or next hops. These alternative paths can be ranked or similarly organized such that the invalidity of the primary path and any number of backup paths can be resolved to select one of the remaining valid backup paths.

In the illustrated and described embodiment of FIG. 1A, the primary route is overwritten with a backup or similar alternate route. However, the process can also be applied to reverse this process by overwriting the backup with the primary route or another alternate route. For example, in situations where there is only a momentary fluctuation in the availability of a link that may be a failure or only an error in reporting. In these cases, the routing protocols may not have had sufficient time to reach convergence and the fast reroute process can quickly correct the route selection before convergence.

Figure 1B:
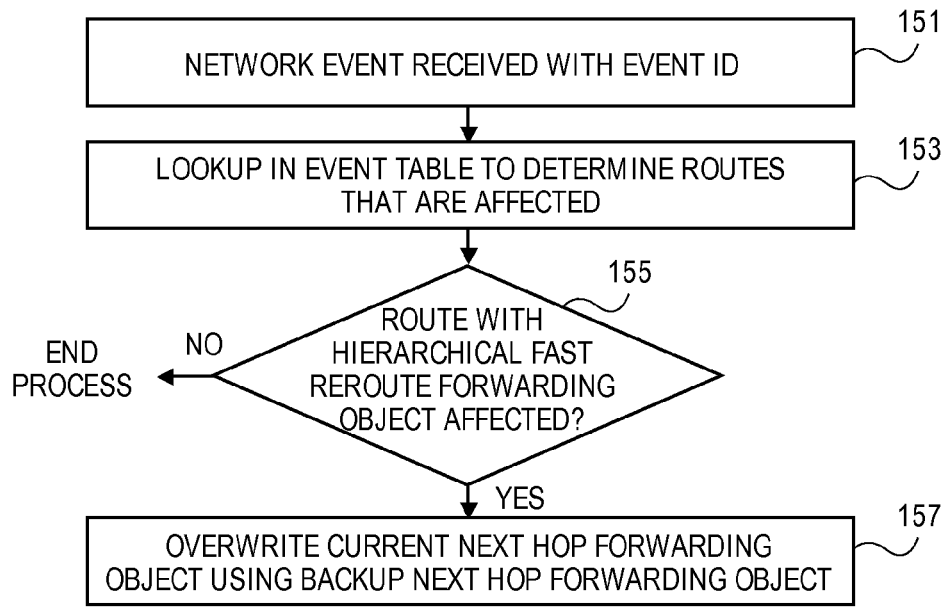
FIG. 1B is a flowchart of one embodiment of a process for implementing a fast reroute process using hierarchical fast reroute routing information base forwarding objects.

FIG. 1B is a flowchart of one embodiment of a process for implementing a fast reroute process using hierarchical fast reroute routing information base forwarding objects. In one embodiment, the process is executed by the FRR proxy function and/or FRR switch functions of the router. These functions can be implemented at the control and forwarding planes, specifically the processing units of these planes, which may be part of a general router central processing or network processing unit (e.g., for the control plane) or a central processing unit or network processing unit of a set of line cards within the router. As discussed above in the overview, hierarchical fast rerouting utilizes a hierarchical fast reroute object that is prepared before receipt of a network event. The hierarchical fast reroute object is generated by traversing a chain of one or more non-hierarchical fast reroute objects and compressing a primary next hop and one or more backup next-hops into a hierarchical fast reroute object, where each backup next hop is associated with a different network event. The hierarchical fast reroute objects can be generated at the time the routing information base is populated, in response to changes in network topology or by administrative direction.

The process can be initiated in response to receiving a network event (Block 151). The network event can be received from an external source such as a message from a neighboring router or from an internal source such as a signal from a port or similar source. The network event can be an indicator of a change in the functioning of the router, such as a failed port, or a change in the function of the network such as a failed link. The network event can include an event identifier that can indicate a type of the network event. Any type of encoding of these network events can be utilized and the router can look up the type of the event using the event identifier (Block 153). In one embodiment, an event table can be maintained by the control plane of the router, which contains a set of entries identifying the actions to be taken in response to receiving each of the types of network events or notifications containing the network event identifiers. The event table can be distributed by the control plane to the switching function located in close proximity to the forwarding process. In one example embodiment, the network event can be a fast reroute message expressly identifying a route to be switched to a backup route.

In one embodiment, the network event indicates that a topology of the network has changed such that the routes defined in the routing information base of the router are affected. Each of the affected routes is checked to determine whether hierarchical fast reroute forwarding objects are included (Block 155). A 'hierarchical fast reroute' forwarding object is a forwarding object that can contain alternate route information that encompasses multiple protocols or network levels. The hierarchical fast reroute forwarding object can include information including next hop information for any number of alternate routes and network levels or protocols and related alternate route information. The next hop information for each network level can include an address (e.g., an IP address, port, label or similar address) and related information about an adjacent network device such as a router or a network edge device depending on the network level of the forwarding object. The identification and construction of the alternate routes can be accomplished using any type or combination of routing protocols and/or protection protocols.

Dependent of the type of network event identifier, a determination is made whether a primary route for each destination with hierarchical fast reroute forwarding objects is no longer valid, due to a link failure, port failure or similar problem associated with the primary route. If the primary route is no longer valid, then a check may be made whether the backup route is valid (if the backup route is not valid then the process may end and require that the routing protocol reconverge). If the backup route is valid, then the current next hop forwarding object for the destination in the forwarding information base of the forwarding plane is overwritten with a copy or replica of a next hop forwarding object of the backup up next hop as defined in the hierarchical fast reroute forwarding object of the routing information base (Block 157).

Just as with the non-hierarchical case, the forwarding plane is not involved in this process at the time of data packet forwarding. The next hop object overwrite process or 'switch' process is transparent to the data forwarding process, which looks up destination addresses of incoming data traffic and receives different next hop information from a lookup in the forwarding information base before and after the switch.

The use of the hierarchical fast reroute forwarding objects in the routing information base and the implementation of the FRR switch and FRR proxy function separate from the forwarding functions provides a fast reroute implementation without degradation of the forwarding function due to the forwarding function having to perform indirect next hop look ups on the forwarding information base where pointers might have been utilized in the forwarding information base to identify backup up next hop objects. Standard forwarding information bases and routing information bases are not capable of supporting hierarchical fast reroute processes without forwarding degradation.

In one embodiment, as with the non-hierarchical process, the next hop forwarding objects overwritten into the forwarding information base by the switch or proxy function are replicas or copies having unique identifiers to enable the original to be distinguished from the copies.

The example illustrated and described in relation to FIG. 1B involves the case where there is a primary route and a backup route. However, one skilled in the art would understand that the hierarchical fast reroute forwarding object can define any number of alternate paths and/or next hops at each network level. These alternative paths can be ranked or similarly organized such that the invalidity of the primary path and any number of backup paths can be resolved to select one of the remaining valid backup paths.

Figure 2A:
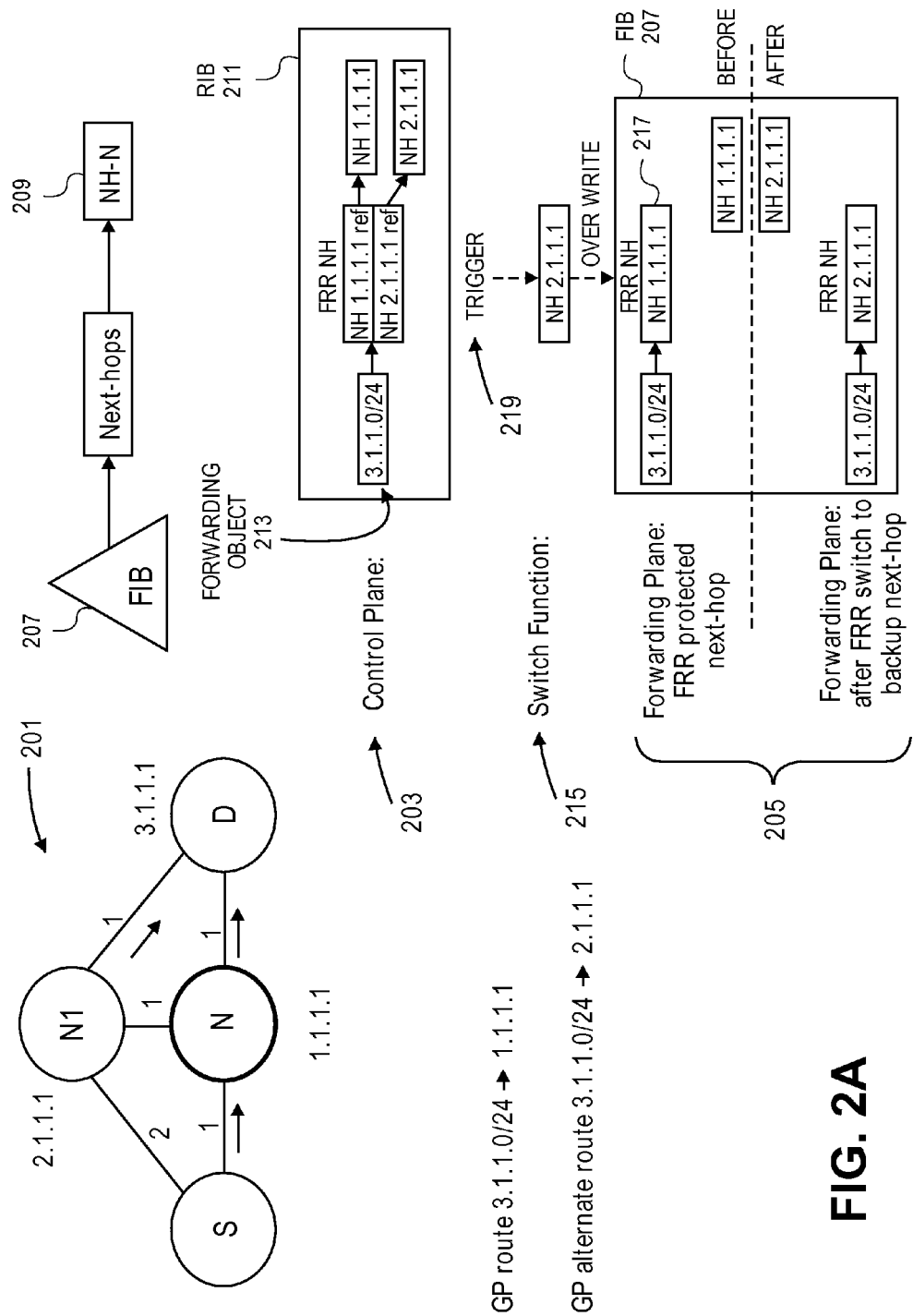
FIG. 2A is a diagram of one embodiment of an example topology and router configuration using fast reroute routing information base forwarding objects.

FIG. 2A is a diagram of one embodiment of an example topology and router configuration using fast reroute routing information base forwarding objects. A network topology 201 is shown with four nodes in a simplified example to illustrate the operation of a non-hierarchical fast reroute process using fast reroute forwarding objects. The network topology 201 includes a source node 'S', two intermediate nodes 'N' and 'N1' and a destination node. The source node here refers to the node at which the data traffic is currently being processed enroute to the destination node through one of two alternate routes via N or N1.

The other information illustrated is the configuration of the different functions separated into a control plane 203 and a forwarding plane 205 of the source node. The FIB 207 includes a current next hop object that identifies N 209, which is part of the primary path from S to D. The control plane 203, more specifically, the routing information base 211, includes the illustrated forwarding object including a destination address or destination address prefix (e.g., 3.1.1.0/24), the fast reroute next hop options for fast reroute (e.g., pointers to the next hop forwarding objects of 1.1.1.1 and 2.1.1.1), which point to the original next hop forwarding objects. The switch function 215 is shown overwriting a replica next hop forwarding object 217 in response to a network event trigger 219 to the forwarding plane, specifically to the forwarding information base 207 of the forwarding plane. The 'before' and 'after' views of the forwarding plane are shown with the forwarding information base 207 having the next hop forwarding object replica of the primary route next hop assigned to the destination address in the 'before' the switch case. The 'after' the switch case has the replica next hop forwarding object assigned to the same destination address in the forwarding information base 207.

Figure 2B:
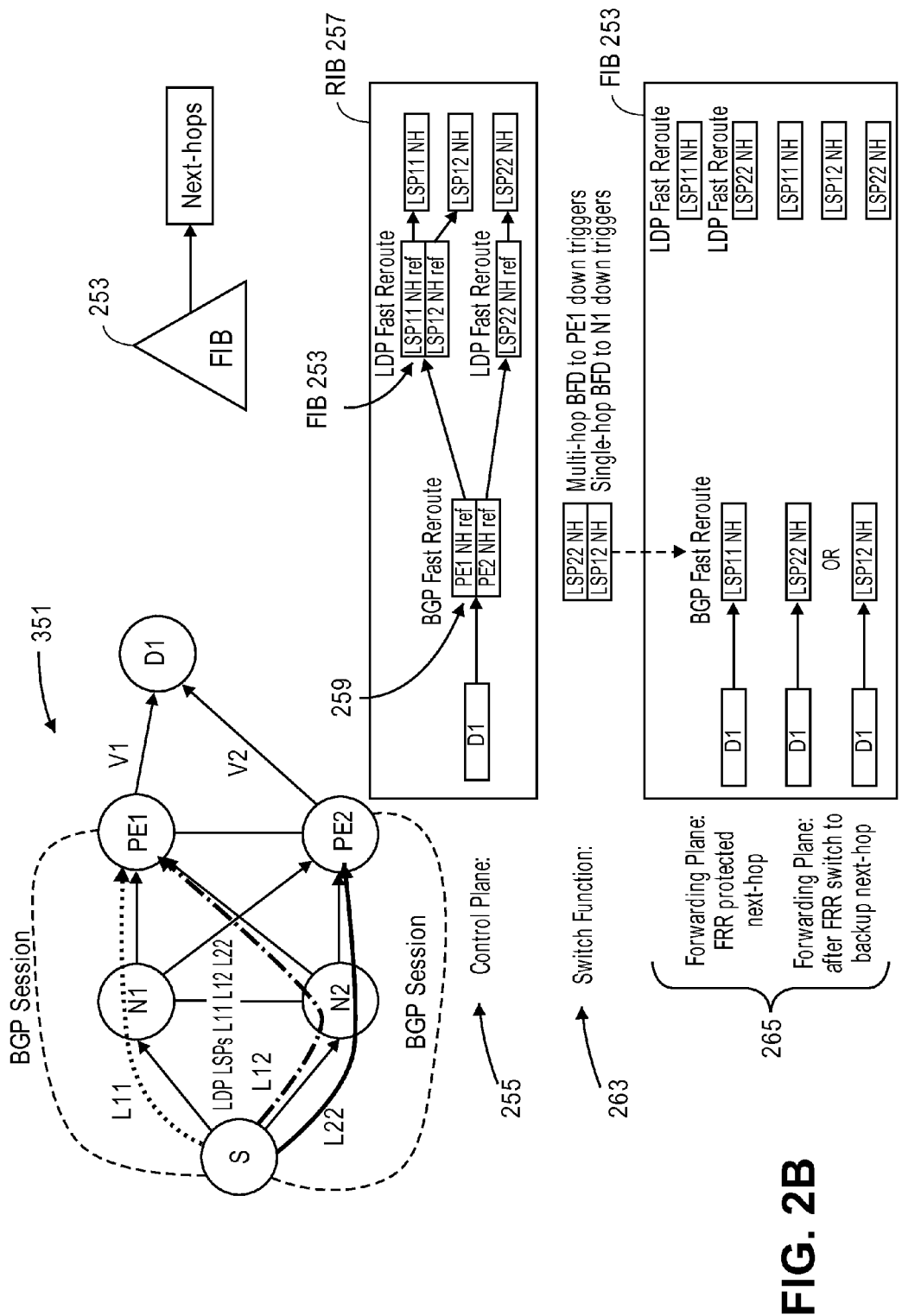
FIG. 2B is a diagram of one embodiment of an example topology and router configuration using hierarchical fast reroute routing information base forwarding objects.

FIG. 2B is a diagram of one embodiment of an example topology and router configuration using hierarchical fast reroute routing information base forwarding objects. Similar to the non-hierarchical example diagram, this diagram shows a simplified network for sake of illustration. This example network 251 includes a source node S, a destination node D1, two intermediate nodes N1 and N2, and two provider edge nodes PE1 and PE2. In this example network topology, the nodes from S to each PE are within a first network domain and routing is implemented via multi-protocol label switching (MPLS). At each PE the routing transitions to another network to reach D1, this routing is managed by BGP. Thus, there are multiple network levels to be managed in this example. Each network level can have multiple routes. In this example, there are three alternate MPLS routes (i.e., label switched paths (LSPs) determined using the link discovery protocol (LDP), labeled L11, L12 and L22, which traverse the MPLS network between the source and PEs. From the two PEs there are two paths to the destination D1 labeled v1 and v2.

As with the non-hierarchical configuration, the FIB 253 contains a set of next hop objects. The control plane 255 includes an entry for the destination D1 in the routing information base 257 where there is a hierarchical fast reroute forwarding object 259 including two BGP level entries and one LDP fast reroute forwarding object 261. The BGP fast reroute forwarding object 259 includes pointers or references to next hop forwarding objects for reaching PE1 and PE2. Each of these next hop forwarding objects is tied to forwarding objects for reaching the respective PE via MPLS. The PE1 is reachable via LSP 11 and LSP 12, and the second level forwarding objects 261 include pointers to the next hop forwarding objects for LSP 11 and LSP 12. The PE2 is reachable only via a single LSP 22, and the second level forwarding object points to the next hop forwarding object of LSP 22.

The FRR switch function 263 is shown to demonstrate the possible triggers leading to the overwriting of the next hop forwarding object of the primary path in the FIB 253 of the forwarding plane 265, which is a replica of LSP 11, with the replica of LSP 22 or LSP 12 depending on the trigger. A two level hierarchical network is shown that uses BGP and LDP, however, one skilled in the art would understand that the network can have any number of additional layers and routes consistent with the principles, processes and structures discussed in relation to the two level example and the processes discussed herein above.

Figure 3A:
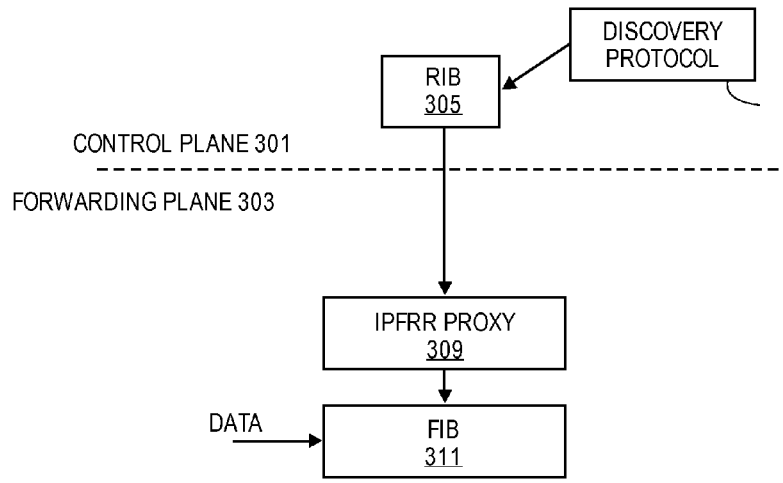
FIG. 3A is a diagram of one example embodiment of a network element implementing a fast reroute process using fast reroute router information base forwarding objects.

FIG. 3A is a diagram of one example embodiment of a network element implementing a fast reroute process using fast reroute router information base forwarding objects. This figure is an abstraction of the implementation showing the relationship between the control plane 301 and the forwarding plane 303. The control plane includes the routing information base (RIB) 305, which is maintained by the routing or discovery protocols 307 that communicate with adjacent routers to determine the network topology.

The control plane 301 provides the IP FRR proxy 309 (encompassing the proxy and switching functions described herein above) with the RIB information and network event information necessary for it to perform the switch from a primary route to a backup (or other alternate) route by reconfiguring the forwarding plane 303 (i.e., updating/overwriting the forwarding information base 311) immediately, rather than waiting for convergence of the discovery or routing protocols to update the forwarding information of the RIB and subsequently the FIB 311.

Data can in this manner be continuously forwarded by the forwarding plane 303 without degradation of its function though the overhead of indirect FIB lookups or similar operations that require additional resources of the forwarding plane 303. The abstracted illustration can be implemented in discrete hardware within a single router as described herein below. The abstraction applies to embodiments with either hierarchical or non-hierarchical fast reroute forwarding objects.

Figure 3B:
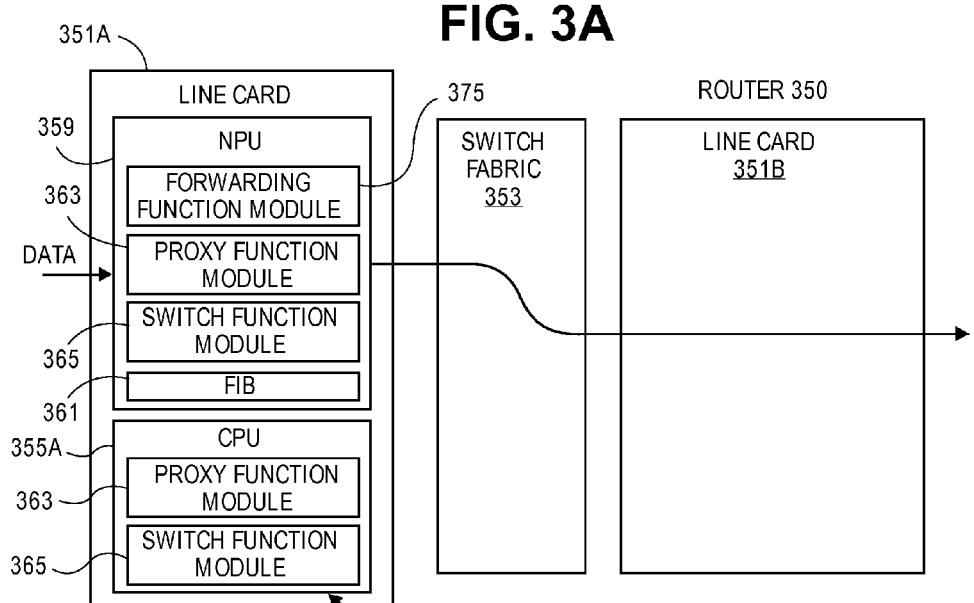
FIG. 3B is a diagram of one example embodiment of a network element implementing a fast reroute process using fast reroute router information base forwarding objects.
Figure 3B:
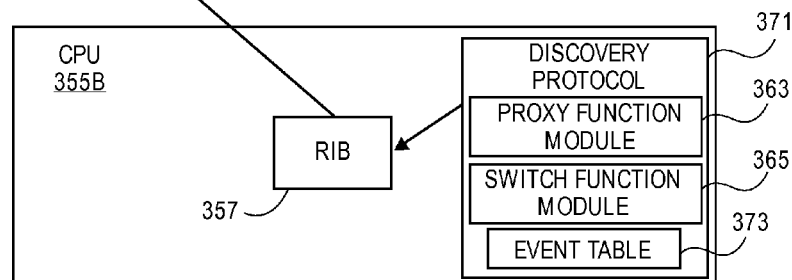

FIG. 3B is a diagram of one example embodiment of a network element implementing a fast reroute process using fast reroute router information base forwarding objects. In one embodiment, the router 350 includes a set of line cards 351A, B, a switch fabric 353, and a central processing unit 355A, B. The line cards 351A,B are primarily responsible for implementing the forwarding plane including the forwarding of received data traffic toward a destination node. The central processing unit 355A, B is primarily responsible for implementing the control plane including managing a routing information base (RIB) 357. The switch fabric 353 facilitates the communication of data traffic between line cards 351A, B.

The line cards 351A, B can include a set of network processing units 359 and/or a central processing unit 355A, B. The network processing unit (NPU) 359 can be any type of processor configured to execute data traffic and forwarding functions via a forwarding function module 375 including possibly multiple levels of processing of received data traffic. The NPU 359 can include or be in communication with a forwarding information base (FIB) 361 with next hop information for each destination address or destination prefix. The FIB 361 can be in a storage device internal or external to the NPU 359. The NPU 359 can implement the FRR proxy functions described herein above as a proxy function module 363 and the switch functions described herein above as a switch function module 365 that are executed as software, firmware or hardwired into the NPU 359. In other embodiments, the line cards 351A, B can include a separate central processing unit 355A (CPU), which is a processing device with general function and programmability that may execute the proxy function module 363 or switch function module 365.

In other embodiments, the proxy function module 363 and switch function module 365 are implemented by the CPU 355B of the router, rather than a CPU 355A of a line card or set of line cards. The router CPU 355B can also implement the discovery 371 and routing protocols that maintain the routing information base (RIB) 357. The RIB 357 can be maintained in a storage device internal or external to the CPU 355B. Similarly, the CPU 355B can maintain or facilitate access to an event table 373 that maps network event identifiers to actions to be taken in response to the network events.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method implemented by a router for executing an internet protocol fast reroute process in response to a network event invalidating a current route to a destination node without degrading forwarding plane functionality or performance by managing the fast reroute process via a proxy function module and a switch function module outside the forwarding plane, the method comprising the steps of:
receiving or generating the network event by the proxy function module, the network event associated with a network event identifier;
looking up the network event identifier in an event table by the proxy function module to determine routes that are affected by the network event;
determining by the proxy function module whether a route with a fast reroute forwarding object, in a routing information base, is affected by the network event in a routing information base, wherein the fast reroute forwarding object is a forwarding object in the routing information base including information for a primary next hop forwarding object and a backup next hop forwarding object, wherein the fast reroute forwarding object includes a replica primary next hop forwarding object and a replica backup next hop forwarding object; and
overwriting by the switch function module a current next hop forwarding object in a forwarding information base using the backup next hop forwarding object in the routing information base, where the forwarding information base in the forwarding plane maintains a single next hop forwarding object for each destination node.

2. The method of claim 1, wherein determining whether the route with the fast reroute forwarding object is affected by the network event, further comprises the step of:
determining whether the fast reroute forwarding object is a hierarchical fast reroute forwarding object.

3. The method of claim 1, further comprising the step of:
using a hierarchical fast reroute object prepared before receipt of the network event by traversing a chain of one or more non hierarchical fast reroute objects to generate a compressed primary next hop and one or more backup next-hops, where each backup next hop is associated with a network event.

4. The method of claim 1, wherein determining whether a route with a fast reroute forwarding object is affected by the network event in the routing information base further comprises the step of:
determining whether a primary route is valid after the network event.

5. The method of claim 1, wherein determining whether a route with a fast reroute forwarding object is affected by the network event in the routing information base further comprises the step of:
determining whether a backup route is valid after the network event.

6. A network element for executing an internet protocol fast reroute process in response to a network event invalidating a current route to a destination node without degrading forwarding plane functionality or performance by managing the fast reroute process via a proxy function module and a switch function module outside the forwarding plane, the network element comprising:
a non-transitory machine readable medium having stored therein a proxy function module and a switch function module;
a first storage device to store a routing information base;
a line card configured to implement the forwarding plane of the network device;
a processor coupled to the non-transitory machine readable medium, the first storage device and the line card, the processor to execute the proxy function module and the switch function module, the proxy function module executed by the processor to receive or generate the network event, the network event associated with a network event identifier, to look up the network event identifier in an event table to determine routes that are affected by the network event, and to determine whether a route with a fast reroute forwarding object, in a routing information base, is affected by the network event, wherein the fast reroute forwarding object in the routing information base is a forwarding object including information for a primary next hop forwarding object and a backup next hop forwarding object, and wherein the fast reroute forwarding object includes a replica primary next hop forwarding object and a replica backup next hop forwarding object, and the switch function module executed by the processor to overwrite a current next hop forwarding object in the forwarding information base using the backup next hop forwarding object in the routing information base, where the forwarding information base maintains a single next hop forwarding object for each destination node.

7. The network element of claim 6, wherein the switching function module is further to determine whether the fast reroute forwarding object is a hierarchical fast reroute forwarding object.

8. The network element of claim 6, wherein the proxy function module is further to traverse a chain of one or more non hierarchical fast reroute objects to generate a compressed primary next hop and one or more backup next-hops, where each back next hop is associated with a network event.

9. The network element of claim 6, wherein the proxy function module is further to determine whether a primary route is valid after the network event.

10. The network element of claim 6, wherein the proxy function module is further to determine whether a backup route is valid after the network event.

* * * * *